United States Patent Office 3,305,557
Patented Feb. 21, 1967

3,305,557
ALLANTOIN p-AMINOBENZOIC ACID COMPLEXES
Irwin I. Lubowe, 667 Madison Ave., New York, N.Y. 10010
No Drawing. Filed Apr. 16, 1965, Ser. No. 448,833
3 Claims. (Cl. 260—299)

This invention relates to new compositions of matter and, more particularly, to novel compositions of allantoin and p-aminobenzoic acid and complexes thereof, and to processes for making said compositions. Said acid and complexes thereof may be used as sunscreening and as anti-irritant agents in the treatment of a variety of dermatological problems.

Allantoin is a nitrogen-containing compound having the following formula:

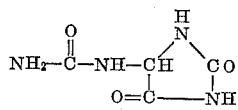

One of the compositions contemplated by the present invention comprises allantoin p-aminobenzoic acid having the following structural formula:

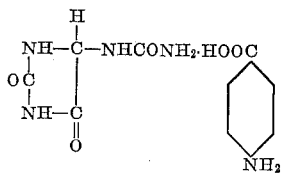

Allantoin p-aminobenzoic acid may be prepared by thoroughly mixing 14 grams of p-aminobenzoic acid with 16 grams of allantoin, to which mixture is immediately added 3 to 5 cc. of boiling water. The resultant mixture is mixed thoroughly and dried at about 150° F. to 160° F. for several hours.

The composition resulting from the foregoing process comprises:

| | Percent |
|---|---|
| p-Aminobenzoic acid | 46.5 ± 3 |
| Allantoin | 53.5 ± 3 |

This composition has a solubility in water of 1% to 2%, and in a 2% solution it has a pH of 5.6.

Another composition contemplated by the present invention comprises aluminum chlorhydroxy allantoin p-aminobenzoate and has the following structural formula:

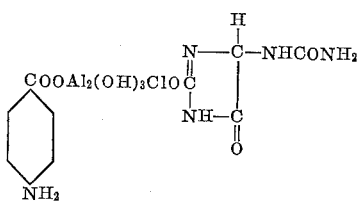

Aluminum chlorhydroxy allantoin p-aminobenzoate may be prepared by thoroughly mixing 14 grams of p-aminobenzoic acid with 40 grams of aluminum chlorhydroxy allantoinate, to which mixture there is immediately added 3 to 5 cc. of boiling water. The resulting mixture is mixed thoroughly and dried at about 150° F. to 160° F. for several hours.

The resulting composition, aluminum chlorhydroxy allantoin p-aminobenzoate, comprises:

| | Percent |
|---|---|
| p-Aminobenzoic acid | 26.0 ± 4 |
| Allantoin | 29.6 ± 4 |
| $Al_2O_3$ | 19.8 ± 1.5 |

The solubility of aluminum chlorhydroxy allantoin p-aminobenzoate is 2% to 3% in water, and in a 2% solution has a pH of 4.9.

A further composition contemplated by the present invention comprises aluminum hydroxy allantoin p-aminobenzoate having the following structural formula:

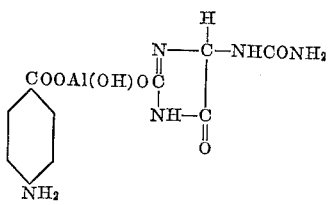

Aluminum hydroxy allantoin p-aminobenzoate may be made by thoroughly mixing 14 grams of p-aminobenzoate with 30 grams of aluminum dihydroxy allantoinate, to which mixture there is immediately added 3 to 5 cc. of boiling water. The resulting mixture is mixed thoroughly and dried at about 150° F. to 160° F. for several hours.

The resulting composition, aluminum hydroxy allantoin p-aminobenzoate, comprises:

| | Percent |
|---|---|
| p-Aminobenzoic acid | 31.8 ± 4 |
| Allantoin | 38.9 ± 4 |
| $Al_2O_3$ | 11.6 ± 1.5 |

Aluminum hydroxy allantoin p-aminobenzoate is insoluble, but in a 2% suspension it has a pH of 6.1.

The foregoing detailed description has been given for clearness of understanding only and no unnecessary limitations are to be understood therefrom. The invention is not limited to the exact details shown and described, for obvious modifications will occur to those skilled in the art.

What is claimed is:
1. Allantoin p-aminobenzoic acid.
2. Aluminum chlorhydroxy allantoin p-aminobenzoate.
3. Aluminum hydroxy allantoin p-aminobenzoate.

References Cited by the Examiner

UNITED STATES PATENTS

| 2,761,867 | 9/1956 | Mecca | 260—299 |
| 3,107,252 | 10/1963 | Lubowe | 260—299 |

OTHER REFERENCES

Burger, Medicinal Chemistry, Interscience, 1960, pp. 75–77, RS403 B8 1960.

Lubowe and Mecca, Proc. S. S. Toilet Goods Assoc., No. 42 (12–64) pp. 6–8.

ALEX MAZEL, *Primary Examiner.*

HENRY R. JILES, *Examiner.*

R. J. GALLAGHER, *Assistant Examiner.*